UNITED STATES PATENT OFFICE.

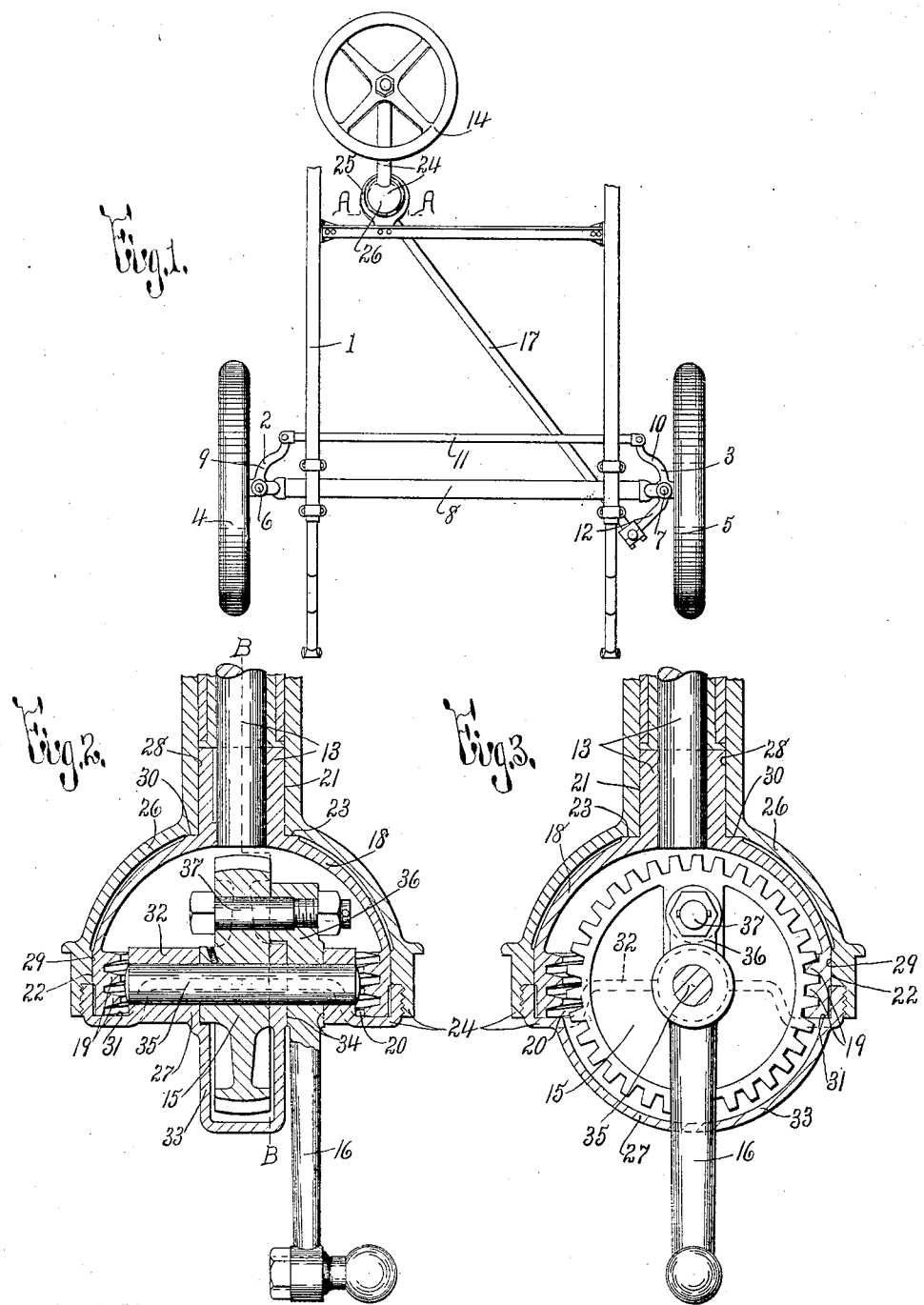

ALEXANDER T. BROWN, OF SYRACUSE, NEW YORK, ASSIGNOR TO BROWN-LIPE GEAR COMPANY, OF SYRACUSE, NEW YORK, A COPARTNERSHIP.

STEERING DEVICE.

No. 809,171.  Specification of Letters Patent.  Patented Jan. 2, 1906.

Application filed May 11, 1904. Serial No. 207,463.

*To all whom it may concern:*

Be it known that I, ALEXANDER T. BROWN, of Syracuse, in the county of Onondaga and State of New York, have invented a certain new and useful Steering Device, of which the following is a specification.

This invention has for its object the production of a steering device for vehicles which is particularly simple in construction and highly effective and durable in use; and to this end it consists in the combinations and constructions hereinafter set forth and claimed.

In describing this invention reference is had to the accompanying drawings, in which like characters designate corresponding parts in all the views.

Figure 1 is a plan of a portion of the running-gear of a vehicle and a preferred embodiment of my steering device operatively connected thereto. Fig. 2 is a vertical sectional view, partly in elevation, on line A A, Fig. 1. Fig. 3 is a vertical sectional view, partly in elevation, on line B B, Fig. 2, the power-transmitting member movable by the driven member being also shown.

1 is a portion of the supporting-frame of a vehicle.

2 3 are supports carrying wheels 4 5 and pivoted at 6 7 to an axle 8, suitably connected to the frame 1. The supports 2 3 are provided with arms 9 10, extending rearwardly from their axes and connected together by a link 11, and one of these supports is provided with an arm 12, extending in front of said axes. The illustrated means for supporting and connecting the wheels 4 5 is particularly applicable for use with the remaining parts of my invention; but it will be apparent to those skilled in the art that any desirable means may be used for this purpose.

13 is a driving member movable about an axis and having one end provided with a suitable handpiece, as a wheel 14.

15 is a driven member actuated by the member 13, and 16 is a power-transmitting member movable by the member 15 and suitably connected to the arm 12, as by a link 17. The driving member 13 is formed at its lower end with a substantially semispherical hollow portion 18, having internal substantially helical teeth 19 and an opening 20, extending from the cavity of the portion 18 through the lower part of the wall thereof. This driving member usually consists of a shaft and an enlarged head fixed to the lower end thereof and provided with the semispherical hollow portion 18. In the preferable construction of my invention the driving member 13 is provided with separated peripheral faces 21 22 of unequal diameter and with an annular shoulder 23.

A suitable casing 24 is fixed to the frame 1 by any desirable clamping means, as a collar 25, and forms a bearing or support in which the driving member 13 is journaled and also forms means for closing the opening 20 of said driving member. This casing 24 preferably comprises a main part or upper section 26 and an end or lower section 27. Said main part 26 is provided with separated internal faces 28 29 of unequal diameter for respectively engaging the faces 21 22 and with an annular shoulder 30, abutting against the shoulder 23 and limiting upward movement of the driving member relatively to its casing 24. The end section 27 is secured to the main part 26 by any suitable means, as screw-threads, which permit said section to be adjusted lengthwise of the part 26 and to be separated therefrom. An inner face 31 of the section 27 engages a lower end face of the driving member 13 for preventing downward movement thereof relatively to the main part 26 of its casing 24 and is provided with a part 32, which projects upwardly within the opening 20 and is formed with separated bearings. Said end section 27 is formed with a hollow extension 33, projecting from its outer face, and with an opening 34, extending through the outer and inner faces of the section 27 at one side of the extension 33.

The driven member 15 is arranged beneath the member 13 in alinement therewith, as illustrated in Fig. 2, is movable in the opening 20 about an axis disposed at an angle to the axis of the driving member 13, is provided with peripheral teeth engaging the teeth 19, and projects into the hollow extension 33. Said member 15 is journaled in any desirable manner in the casing 24, being here shown as fixed to a shaft 35, mounted in the separated bearings of the part 32 of the section 27, and, as seen in Fig. 3, said member 15 is usually arranged eccentrically relatively to the driving member 13 for engaging the teeth at one side thereof with the internal teeth 19 of the driving member and separating the teeth of the diametrically opposite sides of said members.

The power-transmitting member 16 preferably consists of a crank which is arranged in the opening 34, projects beyond the casing 24, is fixed to the shaft 35, being thus movable about the axis of the driven member with said driven member, and is provided with an extension 36, suitably fixed by a bolt or other desirable means 37 to the driven member 15. When the driving member 13 is rocked in either direction, the driven member 15 is correspondingly moved and motion is transmitted therefrom to the wheels 4 5.

A steering device of the described construction consists of a minimum number of parts entirely incased, and thereby protected from dust, and is obviously simple in construction and durable in use.

The construction and operation of my steering device will be readily understood upon reference to the foregoing description and the accompanying drawings, and it will be noted that more or less change may be made in the component parts thereof without departing from the spirit of my invention.

Having thus fully described my invention, what I claim as new, and desire to secure by Letters Patent, is—

1. A steering device for vehicles comprising a driving member having internal substantially helical teeth, and a driven member arranged eccentrically relatively to the driving member and provided with teeth engaging the internal teeth at one side of the driving member and separated from said internal teeth at the diametrically opposite side of the driving member, substantially as and for the purpose specified.

2. A steering device for vehicles comprising a driving member movable about an axis and having internal substantially helical teeth, a driven member arranged in alinement with said axis and movable about an axis disposed at an angle to the axis of the driving member and provided with teeth engaging the former teeth, and fixed means for supporting the driven member, substantially as and for the purpose set forth.

3. A steering device for vehicles comprising a driving member formed with a hollow portion having internal teeth, a driven member provided with teeth engaging the internal teeth within the hollow portion of the driving member, and fixed means projecting within said hollow portion for supporting the driven member, substantially as and for the purpose described.

4. A steering device for vehicles comprising a driving member having internal substantially helical teeth, and peripheral engaging faces of unequal diameter, a driven member provided with teeth engaging the former teeth, and a casing having internal faces of unequal diameter for engaging the former faces, substantially as and for the purpose set forth.

5. In a steering device for vehicles, the combination of a driving member having internal substantially helical teeth, and peripheral engaging faces of unequal diameter, and a casing having internal faces of unequal diameter for engaging the peripheral faces opposing surfaces of the driving member and the casing between said engaging faces being separated from each other; with a driven member provided with teeth engaging the former teeth, substantially as and for the purpose described.

6. In a steering device for vehicles, the combination of a driving member having internal substantially helical teeth, and peripheral engaging faces of unequal diameter, and a casing having internal faces of unequal diameter for engaging said peripheral faces, the driving member and the casing having annular shoulders for preventing endwise movement of one of said parts in one direction relatively to the other; with a driven member provided with teeth engaging the former teeth, substantially as and for the purpose set forth.

7. In a steering device for vehicles, the combination of a driving member having internal teeth, a casing comprising separable sections, each having a face engaged with said member, and a driven member provided with teeth engaging the former teeth, substantially as and for the purpose described.

8. In a steering device for vehicles, the combination of a driving member having internal teeth, a casing comprising separable sections, one being adjustable relatively to the other, and a driven member provided with teeth engaging the former teeth, substantially as and for the purpose specified.

9. In a steering device for vehicles, the combination of a driving member movable about an axis and having internal substantially helical teeth, and a casing comprising a main part, and an end section engaging the driving member; with a driven member movable about an axis arranged at an angle to the axis of the driving member and provided with teeth engaging the former teeth, substantially as and for the purpose set forth.

10. In a steering device for vehicles, the combination of a driving member movable about an axis and formed with a hollow portion having internal substantially helical teeth and an opening extending through the wall of said portion, and a casing comprising a main part, and an end section engaging the driving member and closing the end of the hollow portion thereof; with a driven member arranged in alinement with said axis and movable about an axis disposed at an angle to the axis of the driving member and provided with teeth engaging the former teeth, substantially as and for the purpose described.

11. In a steering device for vehicles, the combination of a driving member formed with a hollow portion having internal substantially helical teeth and an opening extending through the wall of said portion, and a casing comprising a main part, and an end section for closing the end of the hollow portion of said driving member, the driving member and the casing having means for preventing endwise movement of one of said parts relatively to the other; with a driven member provided with teeth engaging the former teeth, substantially as and for the purpose set forth.

12. In a steering device for vehicles, the combination of a driving member formed with a hollow portion having internal teeth, a support for the driving member having a part thereof extended within said hollow portion, and a driven member journaled in said part of the support and provided with teeth engaging the former teeth, substantially as and for the purpose specified.

13. In a steering device for vehicles, the combination of a driving member movable about an axis and formed with a hollow portion having internal teeth, and an opening extending through the wall of said portion, means for closing the opening in the hollow portion of the driving member, and a driven member movable about an axis disposed at an angle to the axis of the driving member, said driven member being journaled in said means and provided with teeth engaging the former teeth, substantially as and for the purpose specified.

14. In a steering device for vehicles, the combination of a driving member formed with a hollow portion having internal teeth, and an opening extending through the wall of said portion, a driven member movable in the opening and provided with teeth engaging the internal teeth, said driven member projecting beyond the opening, and means for closing the opening in the hollow portion of the driving member, said means being provided with an extension for inclosing the part of the driven member projecting beyond the opening of the driving member, substantially as and for the purpose specified.

15. In a steering device for vehicles, the combination of a driving member formed with a hollow portion having internal teeth, and an opening extending through the wall of said portion, a driven member provided with teeth engaging the internal teeth, and means for closing the opening in the driving member, said means having its inner portion provided with a bearing for the driven member, substantially as and for the purpose set forth.

16. In a steering device for vehicles, the combination of a driving member formed with a hollow portion having internal teeth, and an opening extending through the wall of said portion, a driven member movable in the opening and provided with teeth engaging the internal teeth, said driven member projecting beyond the opening, and a casing for the driving member having a part for closing the opening in the driving member, said part having its inner portion provided with a bearing for the driven member and its outer portion formed with an extension for inclosing the portion of the driven member projecting beyond the opening of the driving member, substantially as and for the purpose described.

17. In a steering device for vehicles, the combination of a driving member formed with a hollow portion having internal teeth and an opening in its lower part, and a casing for the driving member comprising a main part, and an end section for closing the opening in the hollow portion of the driving member, the casing and the driving member having means for journaling the driving member in the casing and preventing endwise movement thereof relatively to the casing, and said end section of the casing having its inner portion provided with a bearing and its outer portion formed with a hollow extension; with a driven member provided with teeth engaging the internal teeth, said driven member being journaled in the bearing of the end section of the casing and projecting into said hollow extension, substantially as and for the purpose specified.

18. A steering device for vehicles, comprising a driving member having internal teeth, a driven member provided with teeth engaging the former teeth, a casing, and a power-transmitting member movable about the axis of the driven member with said driven member and projecting beyond the casing, substantially as and for the purpose set forth.

19. A steering device for vehicles, comprising a driving member having internal substantially helical teeth, a driven member provided with teeth engaging the former teeth, and a power-transmitting member movable about the axis of the driven member with said driven member, substantially as and for the purpose set forth.

20. A steering device for vehicles, comprising a driving member having internal substantially helical teeth, a driven member provided with teeth engaging the former teeth, a bearing for the driven member, and a power-transmitting member movable about the axis of the driven member and having an extension projecting beyond the bearing and fixed to the driven member, substantially as and for the purpose described.

21. In a steering device for vehicles, the combination of a driving member formed with a hollow portion having internal teeth, and an opening extending through the wall of said portion, means for closing the opening in the hollow portion of the driving member, said means having an opening therethrough, a driven member provided with teeth engaging the former teeth, and a power-transmitting member movable with the driven member in the opening in said means, substantially as and for the purpose specified.

22. In a steering device for vehicles, the combination of a driving member formed with a hollow portion having internal teeth, and an opening extending through the wall of said portion, means for closing the opening in the hollow portion of the driving member, said means having its inner portion provided with a bearing, a shaft supported by the bearing, a driven member supported by the shaft and movable in the opening and provided with teeth engaging the internal teeth, and a power-transmitting member mounted on the shaft and fixed to the driven member, substantially as and for the purpose set forth.

23. In a steering device for vehicles, the combination of a driving member formed with a hollow portion having internal teeth and an opening extending through the wall of said portion, a casing for the driving member having a part for closing the opening in the hollow portion of the driving member, said part having its inner portion provided with a bearing and its outer portion formed with a hollow extension, and said casing being formed with an opening at one side of the extension, a shaft supported by the bearing, a driven member supported by the shaft and movable in the hollow extension and provided with teeth engaging the internal teeth, and a power-transmitting member passed through the opening at one side of the hollow extension and mounted on the shaft and fixed to the driven member, substantially as and for the purpose described.

24. In combination, pivoted wheel-supports having arms extending rearwardly from their axes, one of the supports being provided with an arm projecting in front of the axes of said supports, a driving member having internal teeth, a driven member provided with teeth engaging the former teeth and a power-transmitting member connected to the forwardly-projecting arm and movable about the axis of the driven member with said driven member, substantially as and for the purpose specified.

In testimony whereof I have hereunto signed my name, in the presence of two attesting witnesses, at Syracuse, in the county of Onondaga, in the State of New York, this 9th day of May, 1904.

ALEXANDER T. BROWN.

Witnesses:
    D. LAVINE,
    S. DAVIS.